United States Patent
Kulkarni et al.

(10) Patent No.: US 7,324,526 B1
(45) Date of Patent: Jan. 29, 2008

(54) EFFICIENT PROCESSING OF CONNECTION CONTROL MESSAGES IN MANAGING VIRTUAL CIRCUITS USING SIGNALING PROTOCOLS

(75) Inventors: Hrishikesh Vishwas Kulkarni, Bangalore (IN); Sudhakar Shenoy, Bangalore (IN); Balaji Lakshmikanth Bangolae, Bangalore (IN); Srinivas Ananthanaga Kuruganti, Bangalore (IN); Amit S. Phadnis, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1121 days.

(21) Appl. No.: 10/268,767

(22) Filed: Oct. 11, 2002

(51) Int. Cl.
*H04L 12/28* (2006.01)
*H04L 12/56* (2006.01)

(52) U.S. Cl. ............... 370/397; 370/399; 370/409; 370/536

(58) Field of Classification Search ............... None
See application file for complete search history.

(56) References Cited

U.S. PATENT DOCUMENTS

| | | | | |
|---|---|---|---|---|
| 5,467,348 | A * | 11/1995 | Fujii et al. | 370/468 |
| 6,014,382 | A * | 1/2000 | Takihiro et al. | 370/399 |
| 6,144,661 | A * | 11/2000 | Katsube et al. | 370/390 |
| 6,522,629 | B1 * | 2/2003 | Anderson, Sr. | 370/236 |
| 6,577,653 | B1 * | 6/2003 | Rochberger et al. | 370/536 |
| 6,683,880 | B2 * | 1/2004 | Kato | 370/399 |

OTHER PUBLICATIONS

ITU-T Recommendation Q.2931 (Feb. 1995); Entitled:"Broadband Integrated Services Digital Network (B-ISDN)—Digitalsubscriber Signalling System No. 2(DSS 2)—User-Network Interface (Uni)Layer 3 Specification for Basic Call/Connection Control"; Abailable from www.atmforum.com; (278 Pages).

The ATM Forum Technical Committee; Entitled:"ATM User-Network Interface (UNI)Signalling Specification, Version 4.0"; AF-SIG-0061.000; Jul. 1996; Available from www.atmforum.com; (136 Pages).

Pending Commonly Owned U.S. Appl. No. 09/976,004, filed Oct. 15, 2001; Inventors: Phadnis et al; Entitled: "Reducing Overhead When Setting Up Multiple Virtual Circuits Using Signaling Protocols"; (46 pages of specification and 5 sheets of drawings).

* cited by examiner

*Primary Examiner*—Chirag G. Shah

(57) ABSTRACT

To send a connection control message associated with a first set of attributes, only a difference of the first set of attributes from a second set of attributes associated with an already active virtual circuit (to a common destination) may be sent (contained in the connection control message). The devices receiving the message may create the necessary configuration for the new virtual circuit by modifying a copy of the configuration of the active virtual circuit. Processing requirements may be minimized as the devices may not need to parse and decode long list of information element. The feature may be particularly important in setting up a virtual circuit for voice calls, as a long list of attributes may be associated with each virtual circuit, but the difference of attributes being only minimal.

29 Claims, 5 Drawing Sheets

US 7,324,526 B1

EFFICIENT PROCESSING OF CONNECTION CONTROL MESSAGES IN MANAGING VIRTUAL CIRCUITS USING SIGNALING PROTOCOLS

RELATED APPLICATIONS

The present application is related to the commonly assigned co-pending U.S. application entitled, "Reducing Overhead When Setting Up Multiple Virtual Circuits Using Signaling Protocols", Ser. No. 09/976,004, filed: Oct. 15, 2001.

BACKGROUND OF THE INVENTION

1. Field of the Invention

The present invention relates to telecommunication networks, and more specifically to a method and apparatus for setting up virtual circuits quickly when using signaling protocols.

2. Related Art

Virtual circuits are often provisioned between network devices. A virtual circuit generally defines a path (including intermediate devices and transmission paths) traversed by data packets from one network device to the other. The network devices at either end of the virtual circuit are generally referred to as end systems.

Signaling protocols are often used to perform various control tasks (set up, release, notify, etc.) in relation to virtual circuits as is well known in the relevant arts. For example, ITU-T recommendation Q.2931 and UNI Signaling Specification together provides a specification using which switched virtual circuits (SVCs) may be controlled in asynchronous transfer mode (ATM) based networks, as is well known in the relevant arts.

Q.2931 is described in further detail in a document entitled, "B-ISDN application protocols for access signaling Broadband Integrated Services Digital Network (B-ISDN)—Digital Subscriber Signaling System No. 2 (DSS 2)—User-Network Interface (UNI) layer 3 specification for basic call/connection control", (hereafter "Q-2931 Standard Document"). UNI 4.0 Standard is described in further detail in a document entitled, "ATM User-Network Interface (UNI) Signaling Specification, Version 4.0", AF-SIG-0061.000, (hereafter "UNI 4.0 Specification") Available from www.atmforum.com. Both the documents are incorporated in their entirety herewith.

Signaling protocols generally define a format for the control messages, which can be used by a network device to perform (and cause other devices to perform) the corresponding control task associated with a virtual circuit. For example, a network device may send a setup message to cause a virtual circuit to be set up, and send a release message to cause the virtual circuit to be terminated.

It may be desirable to process control messages efficiently while minimizing various types of overhead such as bandwidth and/or processing requirements. For example, it may be desirable to set up a virtual circuit quickly at least in some environments. As an illustration, when voice calls are set up using a packet switched network (e.g., using voice over IP network supported by ATM backbone), a virtual circuit may be set up to support a newly initiated voice call.

In such a situation, it may be desirable to complete set up of virtual circuits quickly such that the voice connection is provided quickly. The ability to set up the virtual circuit may be particularly more important when many virtual circuits need to be set up in a fairly short duration.

BRIEF DESCRIPTION OF THE DRAWINGS

The present invention will be described with reference to the accompanying drawings, wherein.

DETAILED DESCRIPTION OF THE PREFERRED EMBODIMENTS

Figure 1:
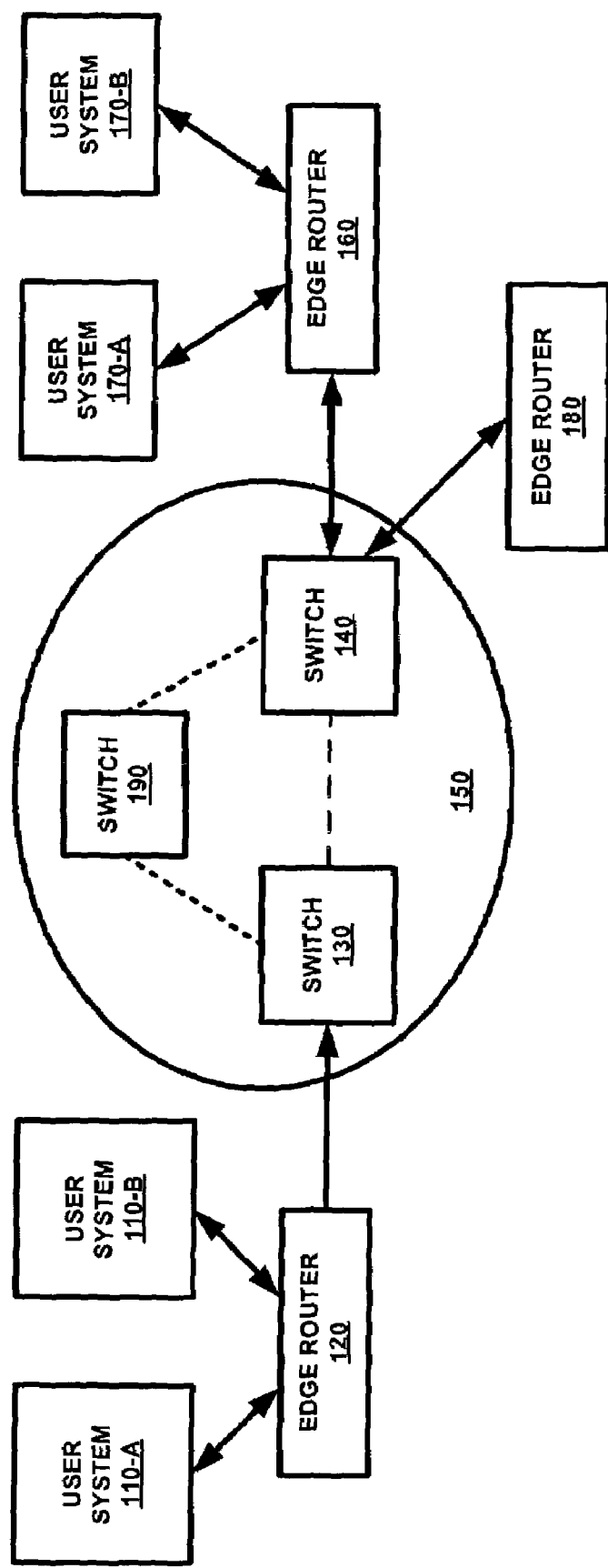
FIG. 1 is a block diagram illustrating an example environment in which the present invention can be implemented.

1. Overview and Discussion of the Invention

An aspect of the present invention enables efficient (minimizing processing and/or bandwidth requirements) processing of connection control messages which are used to perform various control tasks with respect to virtual circuits. Efficiency may be attained by having a network device ("initiating network device") specify the differences in attributes ("differential information") compared to the attributes of a pre-existing virtual circuit to the same destination (other end system) such that the remaining network devices in the same path may conveniently use pre-existing configurations (e.g., data structures) of the pre-existing virtual circuit to process the corresponding connection control message.

By using such pre-existing configurations, processing requirements in the network devices (other than the initiating network device) in the path of the virtual circuit may be minimized, thereby enabling the new virtual circuit to be set up quickly. In addition, as only the differences in attributes may be specified, the bandwidth requirements on a network may also be minimized.

For example, when setting up a new virtual circuit to an end system, an initiating network device may send a setup message containing differential information in relation to a pre-existing virtual circuit connecting to the same end system. The (other) network devices in the path of the virtual circuit may use the configuration data of the pre-existing virtual circuit and differential information to generate configuration data for the new virtual circuit sought to be set up.

According to another aspect of the present invention, an initiating network device may send all the attributes in addition to the differential information (in relation to a pre-existing virtual circuit to the other terminating device/end system). The differential information may be used by network devices in the same path as the previous virtual circuit. However, if the same path is not allocated to the requested virtual circuit, data representing all the attributes may be used (to set up the virtual circuit) by the network devices in the portion of the path which is different from the path of the previous circuit.

As a result, the setup request may be successfully processed even if the path of the requested virtual circuit is caused to differ from the path of the previous virtual circuit. In addition, if a network device does not support the processing of differential information, data representing all the attributes may be used to complete the set task. However, additional bandwidth overhead is present due to the inclusion of both the differential information and all the attributes.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

FIG. 1 is a block diagram illustrating an example environment in which the present invention can be implemented. The environment is shown containing user systems 110-A, 110-B, 170-A and 170-B, edge routers 120, 160 and 180, and switches 130, 140 and 190 in ATM backbone 150. The environment is shown containing a few representative components only for illustration. In reality, each environment typically contains many more components. Each component is described below in further detail.

User systems 110-A, 110-B communicate with user systems 170-A and 170-B using ATM backbone 150. Each user system (e.g., 110-A) interfaces with the connected (e.g., user system 110-A is shown connected to edge router 120) edge router(s) using a protocol such as Internet Protocol (IP). In an embodiment, each user system may enable corresponding users to communicate with other users using voice over Internet Protocol (VOIP) technology. Each user system may correspond to a computer system or workstation, and can be implemented in a known way.

ATM backbone 150 is shown containing switches 130, 140 and 190. Switches 130, 140 and 190 operate consistent with the ATM protocol, and may be implemented in a known way. In general, switches enable edge routers 120, 160 and 180 to communicate with each other on virtual circuits using ATM protocol. The edge routers represent end systems of such virtual circuits, and edge routers and switches are together referred to as network devices and form a communication network. Aspects of the present invention enable the virtual circuits to be set up efficiently as described in sections below with example.

Edge router 120 interfaces with user systems 110-A and 110-B using IP protocol, and with switch 130 using ATM. Edge router 120 may use several virtual circuits (potentially one virtual circuit for each voice call) to communicate with each of the other edge routers 160 and 180. For example, user systems 110-A and 110-B may wish to initiate a voice call with user systems 170-A and 170-B respectively. Accordingly, edge router 120 may need to provide two switched virtual circuits to edge router 160 for the two calls.

The manner in which such virtual circuits can be managed is described below. For illustration, most of the description is provided with respect to set up operation. However, the approaches can be extended to other types of connection control messages (e.g., connect control message in Q.2932 standard) without departing from the scope and spirit of the present invention, as will be apparent to one skilled in the relevant arts based on the disclosure provided herein. Thus, the description is continued with respect to a method using which virtual circuits can be set up efficiently.

3. Method of Initiating a Connection Control Message

Figure 2:
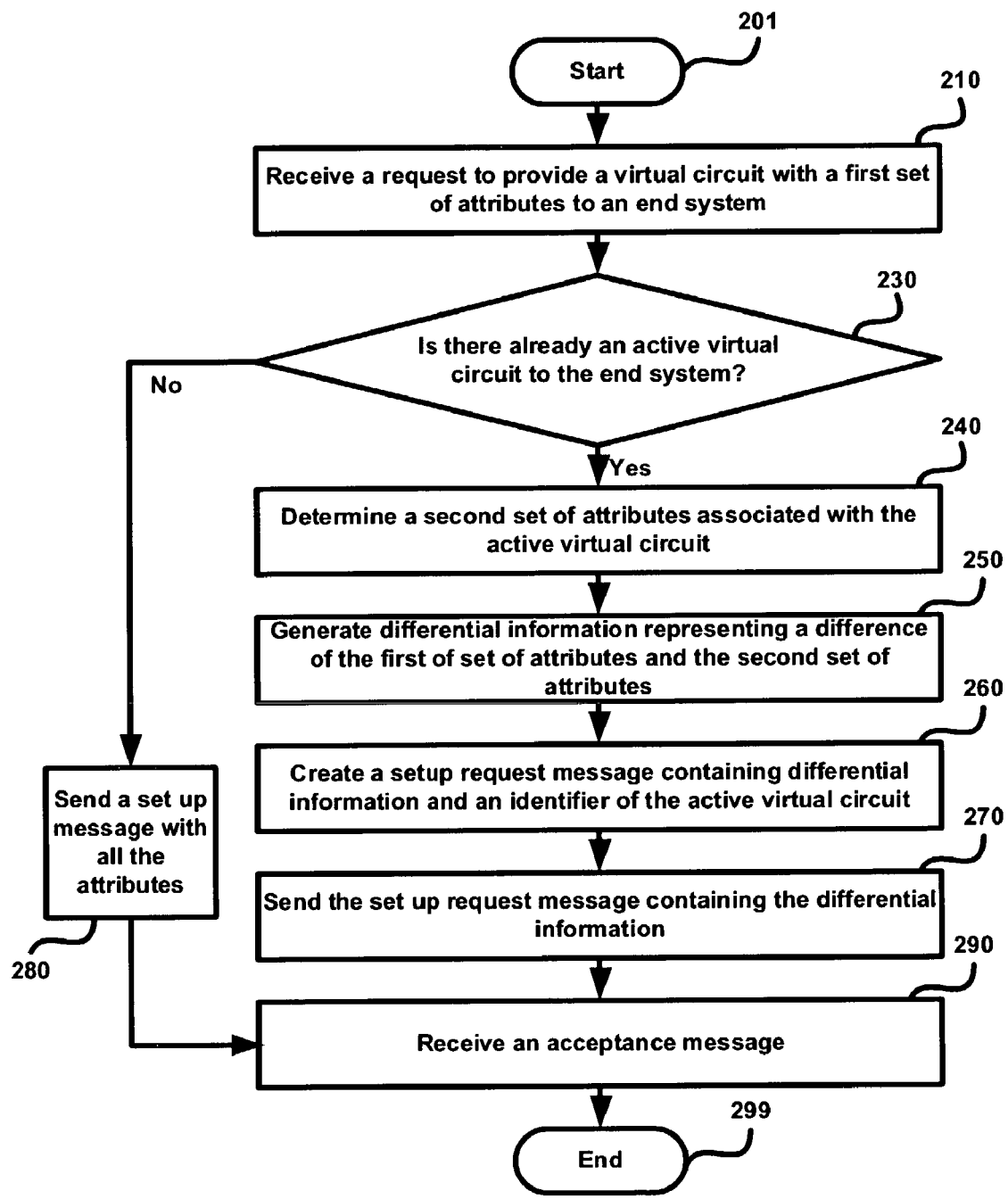
FIG. 2 is a flow chart illustrating a method using which an end system may initiate and set up a new virtual circuit according to an aspect of the present invention.

FIG. 2 is a flow-chart illustrating a method using which several virtual circuits may be set up (example of a control task) between two embodiments according to an aspect of the present invention. The method is described with reference to the devices of FIG. 1 for illustration. However, the steps can be implemented in other devices as well. The method begins in step 201, in which control immediately passes to step 210.

In step 210, edge router 120 (initiating network device or end system) receives a request from user system 110-A to provision a virtual circuit to edge router 160 (terminating network device or end system). The virtual circuit may need to be provisioned with a first set of attributes to the same destination (edge router 160). The attributes may be determined by various factors such as the nature of the virtual circuit to be set up, identity and the quality of services to be provided to the user (or user system 110-A), configuration parameters (e.g., specified by a service provider providing edge router 120), etc. The attributes in an example environment are described in further detail in Q-2931 Standard Document.

In step 230, edge router 120 may determine whether an active virtual circuit is present to the terminating network device. The determination may generally be performed by examining the internal information/tables present in edge router 120. Control passes to step 240 if such a virtual circuit is present. Otherwise control passes to step 280.

In step 240, edge router 120 may determine a second set of attributes associated with (characterizing the operation of) the active virtual circuit. The attributes may again be determined by examining the internal information/tables present in edge router 120.

In step 250, edge router 120 generates differential information representing a difference of the first set of attributes and the second set of attributes. The differential information generally represents the specific attributes which need to be different for the new virtual circuit in comparison to the pre-existing active virtual circuit.

In step 260, edge router 120 creates a setup request message containing the differential information and an identifier of the active virtual circuit. The identifier can be used by the other network devices in the virtual path to identify the active virtual circuit while creating/changing the configuration for the new virtual circuit. The differential information and identifier generally needs to be encoded consistent with a protocol format used in network 150. An example encoding approach for ATM network is described below in further detail for illustration.

In step 270, edge router 120 sends the setup request message to switch 130. The message may be sent in a known way consistent with the implementation of network 150. Control then passes to step 290.

In step 280, edge router 120 creates a setup message containing all the attributes and sends the setup message. The message creation (including content) and sending can be according to a known protocol (e.g., Q.2931). In step 290, a connect (acceptance) message may be received, and edge router 120 may perform any necessary actions to complete setting up of the requested virtual circuit.

However, for the connect message to be received, the remaining network devices in the path of the virtual circuit may need to appropriately process the setup message sent by edge router 120. The manner in which such processing may be performed is described below in further detail.

4. Processing Connection Control Messages

Figure 3A:
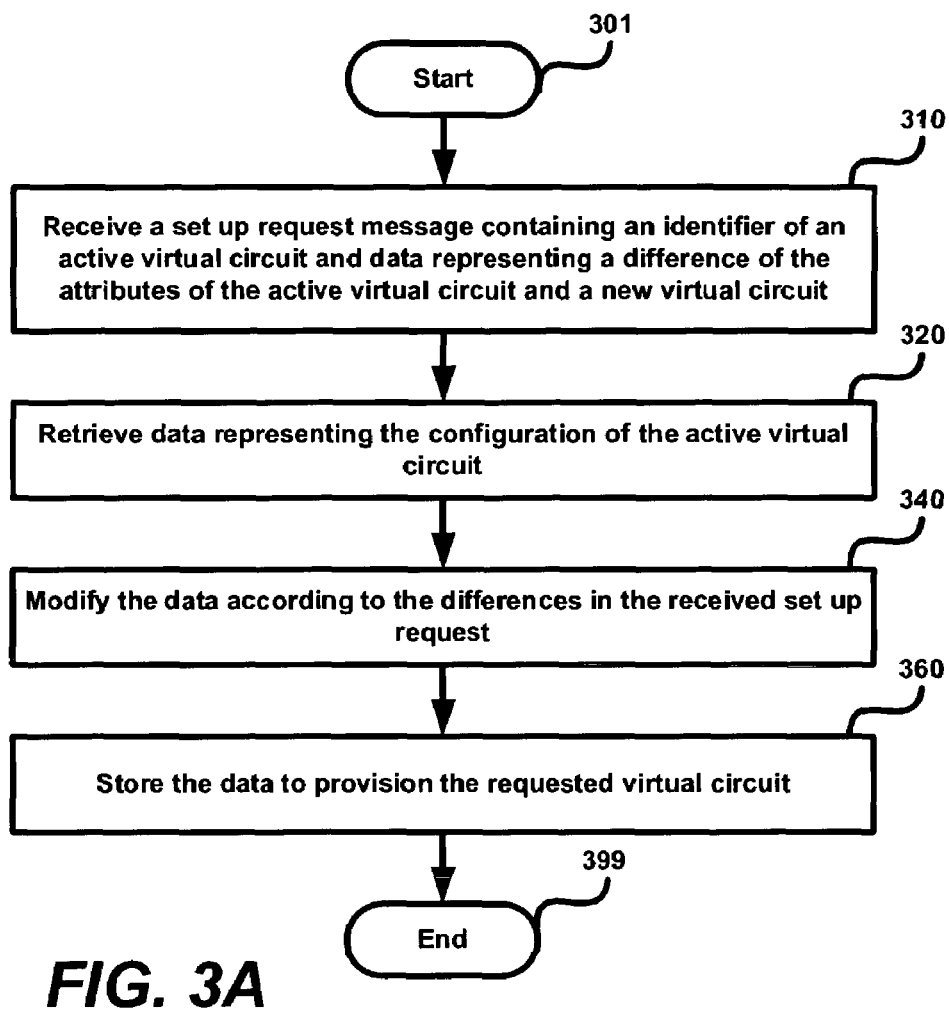
FIG. 3A is a flow chart illustrating a method using which devices may process a setup request received according to an aspect of the present invention.

FIG. 3A is a flow-chart illustrating a method using which a connection control message may be processed by network devices according to an aspect of the present invention. The method is described with reference to the switch 130 of FIG. 1 and setup message of FIG. 2 for illustration. However, the steps can be implemented in the content of other devices and methods as well. The method begins in step 301, in which control immediately passes to step 310.

In step 310, switch 130 receives a setup request message (an example of a connection control message) containing an identifier of an active virtual circuit and data representing a difference of the attributes of the active virtual circuit and a new virtual circuit. The setup requested message may be received from edge router 120 as described above with reference to FIG. 2. In general, each network device receives the setup request message from a previous device in the path of the virtual circuit, and forward the message to a next device.

In step 320, switch 130 retrieves data representing the configuration of the active virtual circuit. The identifier of the active virtual circuit may be used to locate the data. The retrieval generally depends on the implementation of switch 130. In step 340, the retrieved data is modified according to the differences indicated in the setup message. Modification may entail replacing/adding/deleting some of the retrieved data.

In step 360, the data representing the configuration for the requested virtual circuit is stored to provision the requested new virtual circuit. In general, steps 320, 340 and 360 operate to provision the requested virtual circuit according to differential information and the active virtual circuit indicated by the setup message.

It may be appreciated that each of the intermediate network devices (here switches) may receive a setup message from a previous device (in the path of the virtual circuit), ensure that the necessary resources are available to provision the requested virtual circuit, forward the setup message to a next device in the path, receive an acceptance (connect message) from the next device, and then forward the acceptance to the previous device. However, the terminating device would not need to forward the setup message to the next device and wait for the acceptance.

One problem with the approach of FIGS. 2 and 3 is that the requested virtual circuit may need to be provided in a different path (from an intermediate device). For example, an active virtual circuit may have been provided using switches 130 and 140, but switch 130 may determine to provision the new requested circuit via switch 190. Switch 190 may not have the information on the attributes of the prior active virtual circuit. The manner in which such a situation can be addressed is described below.

5. New Virtual Circuit Path not the Same as Previously Active Virtual Circuit According to an aspect of the present invention, setup messages are designed to contain data representing all the attributes in addition to the differential information noted above. By including all the attributes, the setup message can be processed by network devices not in the path of the previously active virtual circuit.

Thus, in the above example in which a previous virtual circuit is provided using switches 130 and 140 only, and edge router 120 sends a setup message to switch 130 and switch 130 determines to use the path via switch 190 to complete provisioning of the new virtual circuit (instead of switch 140), the setup message containing all the attributes may be sufficient for switch 190 to provision the new virtual circuit. Including all the attributes has the additional benefit that switches which are not compatible to process differential information, may use all the attributes to provision the virtual circuit.

The implementations typically require a convention to send differential information and (possibly including all the attributes in addition). The manner in which the differential information can be sent in ATM environments is described below with an example.

6. Packet Format

In an embodiment, a new information element is defined to specify the differential information within the framework of ITU-T standard Q.2931. As is well known, information elements are generally used to specify various attributes for a virtual circuit. Q.2931 is described in further detail in a document entitled, "B-ISDN application protocols for access signaling Broadband Integrated Services Digital Network (B-ISDN)—Digital Subscriber Signaling System No. 2 (DSS 2)—User-Network Interface (UNI) layer 3 specification for basic call/connection control", (hereafter "Q-2931 Standard Document") which is incorporated in its entirety herewith.

Table 3-8 of the Q.2931 Standard Document lists the typical prior information elements specifying various attributes used when setting up a virtual circuit. The information elements in Table 3-8 are hereafter referred to as "specific information elements" to distinguish from the "new information element" defined according to an aspect of the present invention. Section 4 of the Q.2931 Standard Document specifies the manner in which additional information elements may be defined, and the new information element may be defined accordingly.

Figure 3B:
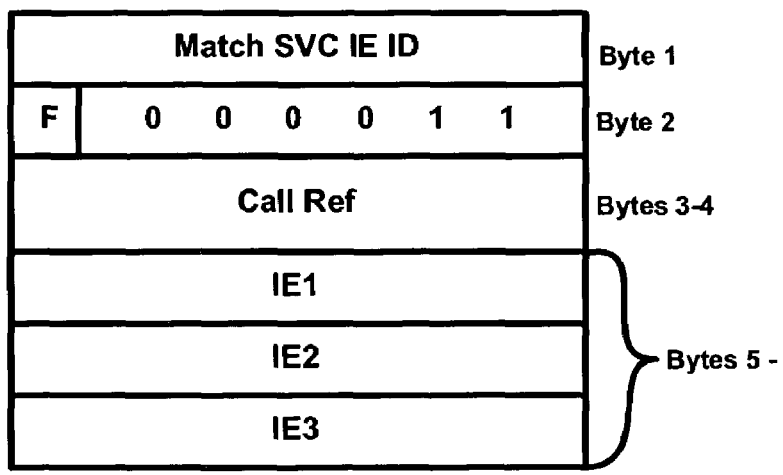
FIG. 3B is a diagram illustrating the format for a new information element defined according to an aspect of the present invention.

The following format/content may be employed for the new information element, which can used to specify the differential information. The packet format is depicted in FIG. 3B also for illustration.

Byte 1 (information element identifier)—Any unused value permitted by the Q.2931 Standard may be used, and the manner in which the value can be selected is described in the standard.

Byte 2: Bit 1 (Flag)—A value of 0 indicates that the contained information elements (bytes 5 onwards below) are to be added/changed. A value of 1 indicates that the attributes are to be removed.

Byte 2: Bits 2 through 7—Number of specific information elements contained in this new information element.

Bytes 3 and 4: The call reference number of the active virtual circuit in reference to which the following information elements are specified. This call reference value may have only local significance and be changed by the devices while the message is being forwarded.

Bytes 5—onwards: The remaining bytes define the information elements (containing the differential information).

Each of the information element may be encoded according to a conventional format described in the Q.2931 document.

It may be appreciated that multiple instances of the new information element may be present in the control message. For example, one instance may be used to indicate the specific information elements contained in the instance are to be added, and another instance may be used to indicate that the specific information elements contained in the another instance are to be removed. The new information elements of above can be used in conjunction with any connection control messages (setup, connect, etc.).

In addition, the new information element(s) may co-exist with the specific information elements (and other new information elements as well) which specify all the attributes with which the virtual circuit is to be set up according to the Q.2931 Standard Document. As a result, the approach of above can be used to support setup messages when a new virtual circuit is set up in a different path compared to the path in which the active circuit is present. The description is continued with reference to additional details of some of the embodiments implemented according to various features of the present invention.

7. Edge Router

Figure 4:
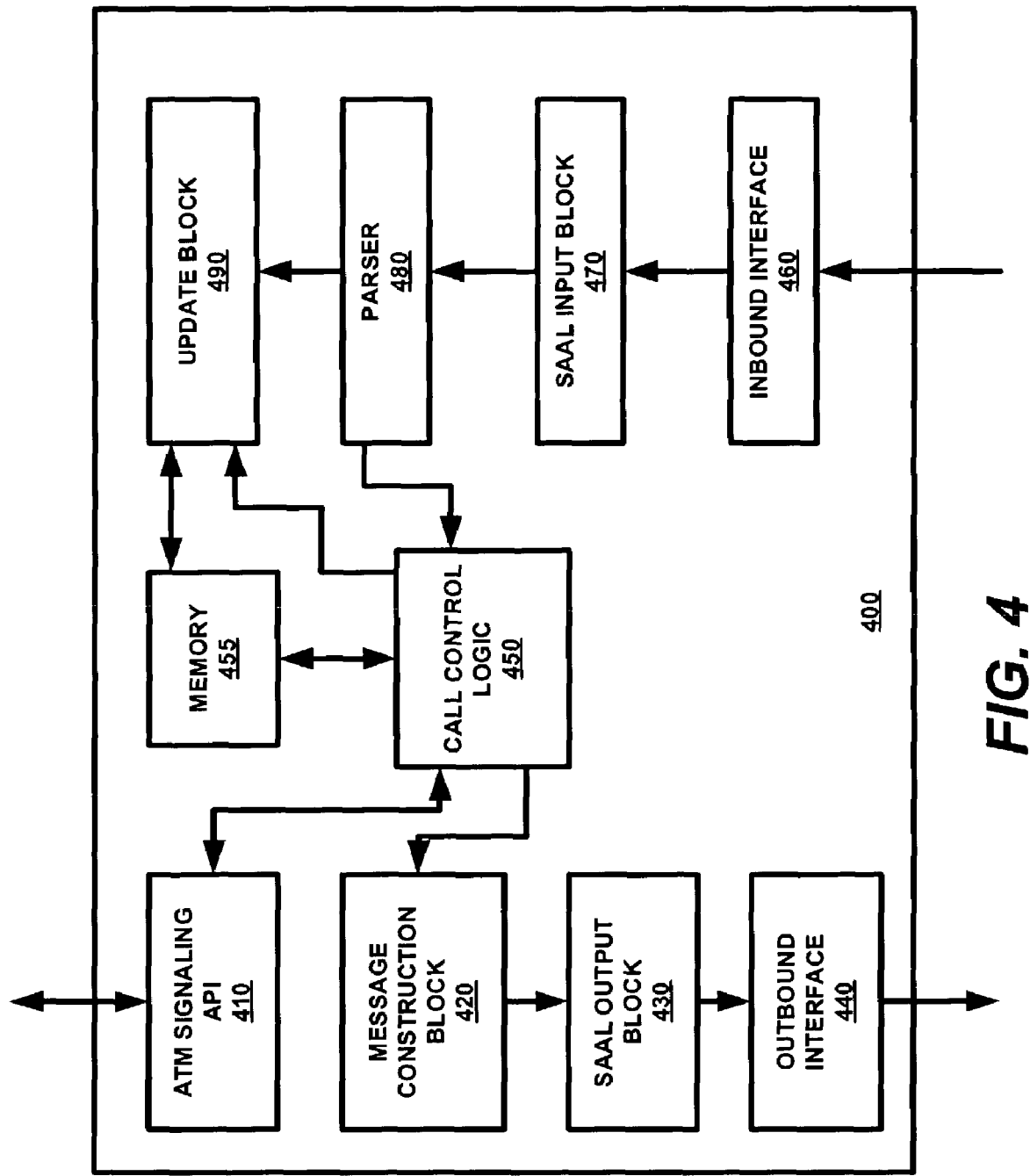
FIG. 4 is a block diagram illustrating the details of an embodiment of a device implemented substantially in the form of integrated circuit according to an aspect of the present invention.

FIG. 4 is a block diagram illustrating the details of an embodiment of device 400 as relevant to various aspects of the present invention. For the purpose of present section, device 400 is assume to correspond to edge router 120. Device 400 is shown containing ATM signaling API (application program interface) 410, message construction block 420, SAAL (signaling ATM adaptation layer) output block 430, outbound interface 440, call control logic 450, memory 455, inbound block 460, SAAL input block 470, parser 480, and update block 490. Each block is described in detail below.

Outbound interface 440 provides the physical and electrical interface required for edge router 120 to send cells on a physical link to switch 130. Similarly, inbound interface 460 provides the physical and electrical interface required for edge router 120 to receive cells from switch 130. Inbound interface 460 and outbound interface 440 may be implemented in a know way.

Memory 455 stores the data that forms the configuration necessary for supporting the various virtual circuits. For example, VPI/VCI mapping information (when forwarding cells), ATM-IP mapping information (when forwarding data received in cells in the form of IP packets, or vice versa), QOS information, the terminating point of each provisioned virtual circuit, etc., may be stored. In embodiments using software to manage the configuration information, the configuration information may be stored in the form of data structures with appropriate associations (between the data structures). Even though shown as one unit, memory 455 may be implemented as multiple units, with each unit being partitioned to store a portion of the information for reasons such as throughput performance.

Call control logic 450 may be viewed as implementing a finite state machine (FSM) using memory 455 to store the state information. The FSM may be designed to manage the states of various virtual circuits provided in accordance with the present invention. With respect to initiating setup of a new virtual circuit, call control logic 450 may determine whether an active virtual circuit is present to the same destination (termination point) as an active virtual circuit already provisioned. Such a determination may be made based on information stored in memory 455.

If such an active virtual circuit is not present, call control logic 450 may send a setup message to cause the virtual circuit in a known way. If such an active virtual circuit is present, call control logic 550 may determine the attributes of the active virtual circuit. The difference of the attributes of the new virtual circuit to be set up and the attributes of the active virtual circuit may be determined, and a new information element containing the differential information may be generated. The new information element and other content is passed to message construction block 420 for transmission in the form of multiple cells.

On the other hand, when a setup request containing a new information element is received, call control logic 450 may first determine the active virtual circuit in relation to which the differential information is provided in the new information element. The active virtual circuit is determined based on the circuit identifier (e.g., call reference value). Call control logic 450 may retrieve the configuration data related to the active virtual circuit by retrieving the corresponding data from memory 455. The data is modified according to the content of the new information element. The modified configuration data may then be stored back in memory 455 to provision the requested new virtual circuit.

If a received setup request does not contain a new information element, the request may be processed in a known way to complete provisioning of the virtual circuit. Once a new virtual circuit is provisioned, an acceptance message may be sent (by using message construction block 420) to the device from which the setup request is received.

ATM signaling API 410 may receive requests for setting up (and release) of virtual circuits from external applications (not shown). ATM signaling API 410 passes the requests to call control logic 450. If/when the status of the processing of the requests is to be communicated to the corresponding applications, ATM signaling API 410 receives the corresponding status messages from call control logic 450, and passes the messages to the corresponding external applications.

Message construction block 420 forms the various messages (e.g., message forwarding, sending connect message/ acceptance, setup message) under the control of call control logic 450. The messages can be formed according to the formats and conventions described in the above sections. SAAL output block 430 receives the messages generated by message construction block 420, and ensures delivery of each message in the form of potentially multiple cells by interfacing with outbound interface 440.

SAAL input block 470 receives from inbound interface 460 cells forming messages (setup messages, connect message, etc.), and forwards the messages to parser 480. Parser 480 parses the incoming messages to determine the specific type of message and the related parameters. The type determination and related parameters are forwarded to call control logic 450. SAAL output block 430, SAAL input block 470 and parser 480 may be implemented in a known way.

Update block 490 updates the structures in memory 455 under the control of call control logic 450 (in response to various signaling messages). When an acceptance message indicates that a virtual circuit is accepted, the corresponding data in memory 455 is updated to reflect the status (and the accepted parameters). Similarly, the data may be updated in response to various connection control messages.

Thus, the description of above illustrates the manner in which an edge router may initiate a setup request and also to process a received setup request. However, for the acceptance messages to be received, the switches in between may need to be implemented in a cooperative manner. The manner in which switches may be implemented is described below with examples.

8. Switches

The operation and implementation of switches is described now with reference to FIG. 4. For the purpose of the present section, device 400 is assumed to represent switch 130 (or 140). Only the significant differences of switch 130 in relation to edge router 120 are described below for conciseness.

Memory 455 may store switch structures (which translate incoming VPI/VCI to an outgoing VPI/VCI, and incoming call reference to an outgoing call reference) for the virtual circuits passing through switch 130, in addition to the three types of structures noted above.

Call control logic 450 interfaces with message construction block 420 to semantically propagate (i.e., propagate the same content while performing changes such as translating a received call reference to a new call reference which is recognized in the next hop of the packet) the request and response messages further down the connection path.

However, there may situations when a next hop for a requested new virtual circuit is not the same the same as the next hop of an active circuit in relation to which differential information is provided. In such a situation, call control logic 450 may remove the differential information element, before forwarding a setup request message on the next hop. The next hop may be determined to be different, for example, to balance load among several possible paths to the same termination point (end device). By removing the differential information element, the network devices in the new path may merely use the attributes forming complete information in setting up virtual circuits.

In addition, call control logic 450 interfaces with update block 490 to create/update the data structures according to the status of various virtual circuits. The structures may be created when the corresponding setup messages are semantically propagated. The switch structures are removed when the corresponding release signaling messages are received.

Thus, using the approaches described above, the connection control messages can be processed efficiently. It should be understood that each feature of the present invention can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing the network devices with a desired mix of hardware, software and/or firmware. An embodiment implemented substantially in software is described below.

9. Software Implementation

Figure 5:
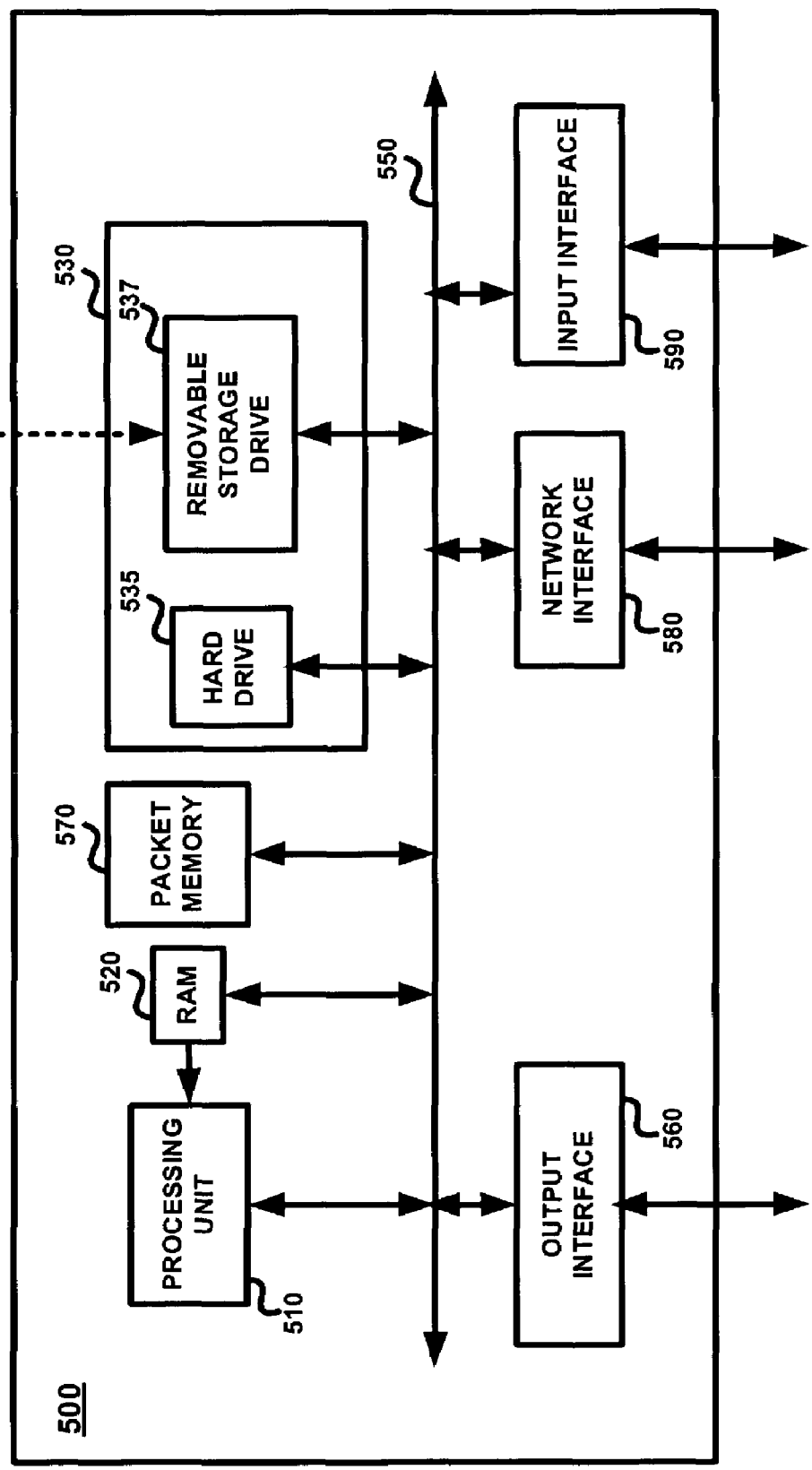
FIG. 5 is a block diagram illustrating the details of an embodiment of a device implemented substantially in the form of software according to an aspect of the present invention.

FIG. 5 is a block diagram illustrating the details of device 500 in one embodiment. Device 500 may correspond to one of edge routers 120, 160 and 180, and switches 130, 140 and 190. Device 500 is shown containing processing unit 510, random access memory (RAM) 520, storage 530, output interface 560, packet memory 570, network interface 580 and input interface 590. Each component is described in further detail below.

Output interface 560 provides output signals (e.g., display signals to a display unit, not shown) which can form the basis for a suitable user interface for an administrator to interact with device 500. Input interface 590 (e.g., interface with a key-board and/or mouse, not shown) enables an administrator to provide any necessary inputs to device 500. Output interface 560 and input interface 590 can be used, for example, to facilitate a network administrator to enable/disable various features provided in accordance with the present invention.

Network interface 580 enables device 500 to send and receive data on communication networks using asynchronous transfer mode (ATM). When device 500 corresponds to an edge router, communication using Internet Protocol (IP) may also be enabled. Network interface 580, output interface 560 and input interface 590 can be implemented in a known way.

RAM 520, storage 530, and packet memory 570 may together be referred to as a memory. RAM 520 receives instructions and data on path 550 from storage 530, and provides the instructions to processing unit 510 for execution. In addition, RAM 520 may be used to store/implement tables described above as necessary for the specific type of device. In an embodiment, RAM 520 is used to store the data structures which are necessary for provisioning a virtual circuit within device 500.

Packet memory 570 stores (queues) cells/packets received and/or waiting to be forwarded (or otherwise processed) on different ports. Secondary memory 530 may contain units such as hard drive 535 and removable storage drive 537. Secondary storage 530 may store the software instructions and data, which enable device 500 to provide several features in accordance with the present invention.

Some or all of the data and instructions may be provided on removable storage unit 540, and the data and instructions may be read and provided by removable storage drive 537 to processing unit 510 via RAM 520. Floppy drive, magnetic tape drive, CD-ROM drive, DVD Drive, Flash memory, removable memory chip (PCMCIA Card, EPROM) are examples of such removable storage drive 537.

Processing unit 510 may contain one or more processors. Some of the processors can be general purpose processors which execute instructions provided from RAM 520. Some can be special purpose processors adapted for specific tasks (e.g., for memory/queue management). The special purpose processors may also be provided instructions from RAM 520. In general processing unit 510 reads sequences of instructions from various types of memory medium (including RAM 520, storage 530 and removable storage unit 540), and executes the instructions to provide various features of the present invention.

Embodiments according to FIG. 5 can be used to implement switches and edge routers which facilitate the sending/receiving and processing of connection control messages according to various aspects of the present invention. While the virtual circuits are described as terminating at edge routers, it should be understood that alternative embodiments can be implemented to terminate/initiate the virtual circuits within switches (e.g., switch 120) without departing from the scope and spirit of various aspects of the present invention, as will be apparent to one skilled in the relevant arts based on the disclosure provided herein.

Thus, using a combination of the concepts and approaches described above, several switches and edge routers may be implemented in accordance with the present invention. The processing overhead on the device and/or bandwidth usage on network 150 can thus be minimized.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of processing a control message related to a first virtual circuit, said method being performed in a first network device, said method comprising:
  receiving said control message;
  examining said control message to determine whether said control message contains data representing an identifier and a difference of a second plurality of attributes and a first plurality of attributes, wherein said identifier identifies an active virtual circuit, said active virtual circuit being set up with said first plurality of attributes, said control message being designed to perform a control task on said first virtual circuit using said second plurality of attributes; and
  performing an internal configuration according to a configuration of said active virtual circuit and said difference; wherein said performing comprises:
    retrieving said configuration of said active virtual circuit by using said identifier, said configuration containing said first plurality of attributes;
    modifying said first configuration according to said difference to generate a new configuration; and
    storing said new configuration to perform said control task on said first virtual circuit.

2. The method of claim 1, wherein said control message comprises a setup request to set up said first virtual circuit.

3. The method of claim 2, wherein said network is based on asynchronous transfer mode (ATM), and wherein said difference is encoded in a new information element according to Q.2931 standard.

4. The method of claim 3, wherein said first network device comprises an edge router.

5. The method of claim 3, wherein said first network device comprises a switch.

6. The method of claim 5, further comprising:
  determining a next network device on which said setup request is to be forwarded;
  determining whether said next network device is contained in a path of said active virtual circuit; and
  deleting said new information element from said control message before forwarding said control message to said next network device if said next network device is not in the path of said active virtual circuit.

7. The method of claim 3, wherein said identifier comprises a call reference number.

8. A computer readable medium carrying one or more sequences of instructions for causing a first network device to process a control message related to a first virtual circuit, wherein execution of said one or more sequences of instructions by one or more processors contained in said system causes said one or more processors to perform the actions of:
  receiving said control message;
  examining said control message to determine whether said control message contains data representing an identifier and a difference of a second plurality of attributes and a first plurality of attributes, wherein said identifier identifies an active virtual circuit, said active virtual circuit being set up with said first plurality of attributes, said control message being designed to perform a control task on said first virtual circuit using said second plurality of attributes; and
  performing an internal configuration according to a configuration of said active virtual circuit and said difference; wherein said performing comprises:
    retrieving said configuration of said active virtual circuit by using said identifier, said configuration containing said first plurality of attributes;
    modifying said first configuration according to said difference to generate a new configuration; and
    storing said new configuration to perform said control task on said first virtual circuit.

9. The computer readable medium of claim 8 wherein said control message comprises a setup request to set up said first virtual circuit.

10. The computer readable medium of claim 9, wherein said network is based on asynchronous transfer mode (ATM), and wherein said difference is encoded in a new information element according to Q.2931 standard.

11. The computer readable medium of claim 10, wherein said first network device comprises an edge router.

12. The computer readable medium of claim 10, wherein said first network device comprises a switch.

13. The computer readable medium of claim 12, further comprising:
  determining a next network device on which said setup request is to be forwarded;
  determining whether said next network device is contained in a path of said active virtual circuit; and
  deleting said new information element from said control message before forwarding said control message to said next network device if said next network device is not in the path of said active virtual circuit.

14. The computer readable medium of claim 10, wherein said identifier comprises a call reference number.

15. A first network device for processing a control message related to a first virtual circuit, said first network device comprising:
  means for receiving said control message;
  means for examining said control message to determine whether said control message contains data representing an identifier and a difference of a second plurality of attributes and a first plurality of attributes, wherein said identifier identifies an active virtual circuit, said active virtual circuit being set up with said first plurality of attributes, said control message being designed to perform a control task on said first virtual circuit using said second plurality of attributes; and
  means for performing an internal configuration according to a configuration of said active virtual circuit and said difference; wherein said means for performing is operable to retrieve said configuration of said active virtual circuit by using said identifier, said configuration containing said first plurality of attributes, modify said first configuration according to said difference to generate a new configuration, and store said new configuration to perform said control task on said first virtual circuit.

16. The first network device of claim 15, wherein said control message comprises a setup request to set up said first virtual circuit.

17. The first network device of claim 16, wherein said network is based on asynchronous transfer mode (ATM), and wherein said difference is encoded in a new information element according to Q.2931 standard.

18. The invention of claim 17, wherein said first network device comprises an edge router.

19. The invention of claim 17, wherein said first network device comprises a switch.

20. The first network device of claim 19, further comprising:
- means for determining a next network device on which said setup request is to be forwarded;
- means for determining whether said next network device is contained in a path of said active virtual circuit; and
- means for deleting said new information element from said control message before forwarding said control message to said next network device if said next network device is not in the path of said active virtual circuit.

21. The first network device of claim 17, wherein said identifier comprises a call reference number.

22. A first network device for processing a control message related to a first virtual circuit, said first network device comprising:
- an interface receiving said control message;
- a call control logic block examining said control message to determine whether said control message contains data representing an identifier and a difference of a second plurality of attributes and a first plurality of attributes, wherein said identifier identifies an active virtual circuit, said active virtual circuit being set up with said first plurality of attributes, said control message being designed to perform a control task on said first virtual circuit using said second plurality of attributes,
- wherein said call control logic block performs an internal configuration according to a configuration of said active virtual circuit and said difference, said call control logic block retrieves said configuration of said active virtual circuit by using said identifier, said configuration containing said first plurality of attributes, said call control logic block modifying said first configuration according to said difference to generate a new configuration, said call control logic block storing said new configuration to perform said control task on said first virtual circuit.

23. The first network device of claim 22, wherein said control message comprises a setup request to set up said first virtual circuit.

24. The first network device of claim 23, wherein said network is based on asynchronous transfer mode (ATM), and wherein said difference is encoded in a new information element according to Q.2931 standard.

25. The first network device of claim 24, wherein said interface comprises one of an inbound interface and an ATM signaling application programming interface.

26. The invention of claim 24, wherein said first network device comprises a switch.

27. The first network device of claim 26, wherein said call control logic block determines a next network device on which said setup request is to be forwarded, said call control logic block determining whether said next network device is contained in a path of said active virtual circuit, said call control logic block further deleting said new information element from said control message before forwarding said control message to said next network device if said next network device is not in the path of said active virtual circuit.

28. The first network device of claim 24, wherein said identifier comprises a call reference number.

29. The invention of claim 24, wherein said first network device comprises an edge router.

* * * * *